US008364199B2

(12) United States Patent
Xue et al.

(10) Patent No.: US 8,364,199 B2
(45) Date of Patent: Jan. 29, 2013

(54) METHODS AND APPLICATIONS FOR SUPPORTING RADIO ACCESS SYSTEM SELECTION BY MULTI-MODE MOBILE STATIONS

(75) Inventors: Hao Xue, Ottawa (CA); M. Khaledul Islam, Ottawa (CA); William Daniel Willey, San Francisco, CA (US)

(73) Assignee: Research In Motion Limited, Waterloo (CA)

( * ) Notice: Subject to any disclaimer, the term of this patent is extended or adjusted under 35 U.S.C. 154(b) by 917 days.

(21) Appl. No.: 11/627,740

(22) Filed: Jan. 26, 2007

(65) Prior Publication Data

US 2008/0182615 A1 Jul. 31, 2008

Related U.S. Application Data

(60) Provisional application No. 60/821,193, filed on Aug. 2, 2006.

(51) Int. Cl.
*H04M 1/00* (2006.01)
(52) U.S. Cl. .................. 455/552.1; 455/422.1; 455/425; 455/432.3; 455/435.3
(58) Field of Classification Search ............... 455/422.1, 455/425, 432.3, 435.2, 435.3, 552.1
See application file for complete search history.

(56) References Cited

U.S. PATENT DOCUMENTS

| | | | | |
|---|---|---|---|---|
| 5,950,130 | A * | 9/1999 | Coursey | 455/432.1 |
| 2003/0083064 | A1* | 5/2003 | Cooper | 455/432 |
| 2004/0203824 | A1 | 10/2004 | Mock et al. | |
| 2004/0203893 | A1* | 10/2004 | Kotzin | 455/456.1 |
| 2005/0048969 | A1 | 3/2005 | Shaheen et al. | |
| 2005/0136898 | A1 | 6/2005 | Shaheen et al. | |
| 2006/0282554 | A1* | 12/2006 | Jiang et al. | 710/14 |
| 2007/0019575 | A1* | 1/2007 | Shaheen | 370/310 |

FOREIGN PATENT DOCUMENTS

| | | |
|---|---|---|
| EP | 1 515 577 A2 | 3/2005 |
| EP | 1 684 537 A | 7/2006 |
| WO | 01/43487 | 6/2001 |
| WO | 03/096727 | 11/2003 |
| WO | 03/100647 A | 12/2003 |
| WO | 2004034623 A2 | 4/2004 |
| WO | 2004/060014 | 7/2004 |
| WO | 2005/039112 A | 4/2005 |
| WO | 2005048631 A1 | 5/2005 |
| WO | 2005048632 A1 | 5/2005 |
| WO | 2005/117463 | 12/2005 |

OTHER PUBLICATIONS

Dunn, Doug et al., "Kyocera, Nokia and RIM MMSS Proposal", 3rd Generation Partnership Project 2 "3GPP2", pp. 1-28, Oct. 30, 2006.
Office Action from corresponding Japanese Patent Application No. 2007-202351 dated Dec. 1, 2009.
English-language translation of Office from corresponding Japanese Patent Application No. 2007-202351 dated Dec. 1, 2009.
Partial Search Report for corresponding European Patent Application No. 11178189.4, mailed Oct. 10, 2011, 7 pages.
Search Report for corresponding European Patent Application No. 11178189.4, mailed Dec. 2, 2011, 11 pages.

* cited by examiner

*Primary Examiner* — Nimesh Patel
(74) *Attorney, Agent, or Firm* — Novak Druce + Quigg LLP

(57) ABSTRACT

Methods are provided for a multi-mode mobile station to perform multi-mode system selection using a multi-mode system selection algorithm as a function of multi-mode overlay information. The multi-mode overlay information includes a plurality of associations, each association being between a respective set of systems that serve at least a common geographical area, at least some of the associations being between systems using differing radio access technology. Methods are also provided for a system to prepare multi-mode overlay information that includes a plurality of associations and send the multi-mode overlay information to the mobile station.

22 Claims, 11 Drawing Sheets

FIG. 3

MMSS Download Request Parameter Block 41

| Index 43 | Overlay Group Number 45 | System Info System Type 48 | System Info Specific Info (example) 49 | Intra-Group Overlay Priority 44 | Higher Priority Network Search Time (example 1) 46 | Higher Priority Network Search Time (example 2) 47 |
|---|---|---|---|---|---|---|
| 0 | 0 | CDMA | SID=6 NID=1 | more | - | 5 minutes |
|   | 0 | GSM | MCC=350 MNC=22 LAC=2 | same | 10 minutes | 10 minutes |
|   | 0 | UMTS | MCC=350 MNC=22 LAC=3 | same | 5 minutes | - |
| 1 | 1 | CDMA | SID=6 NID=2 | more | - | 5 minutes |
|   | 1 | GSM | MCC=350 MNC=22 LAC=3 | more | 15 minutes | 10 minutes |
|   | 1 | WLAN | SSID | same | 10 minutes | - |

(40, 42)

Table 1
MMSS Download Request Parameter Block

| Field | Length(bits) |
|---|---|
| num_overlay_group | 4 |

Table 2
"num_overlay_group" occurrences of the following:

| Field | Length(bits) |
|---|---|
| Group_id | 4 |
| System_type | See table 3 |
| Specific_info | See table 4 |
| priority | Bit 1<br><br>More:1<br>Same:0 |
| Search_time | 7 |

Table 3
System information "System_type"

| Type Specific Record | Value |
|---|---|
| GSM | 0 |
| CDMA | 1 |
| WLAN | 2 |
| UMTS | 3 |

Table 4
System information "Specific_info"

| Type Specific Record | Length(bits) |
|---|---|
| PLMN_LAC type | PLMN:24<br>LAC:16 |
| sid_nid_type | Sid:15<br>Nid:16 |
| ssid_type | 8 |

FIG. 4

Table 5
Multi-RAT Capability Support

| Type Specific Record | Value | Comments |
|---|---|---|
| GSM/GPRS/UMTS_Support | 0: not support GSM/GPRS/UMTS<br>1: support GSM/GPRS/UMTS | If set to "1", see Table 7 for GSM/GPRS/UMTS RAT type |
| CDMA_Support | 0: not support 1x/1xEVDO<br>1:support CDMA 1x/1xEVDO | If set to "1", see Table 6 for CDMA RAT type |
| WLAN_Support | 0: not support WLAN<br>1: support WLAN | |
| Reserved | | |

Table 6 CDMA RAT Type

| Type Specific Record | Length(bits) |
|---|---|
| CDMA 1X | 1 |
| 1X EVDO | 1 |
| Reserved for future type of CDMA technology | 6 |

Table 7 GSM/GPRS/UMTS RAT Type

| Type Specific Record | Length(bits) |
|---|---|
| GSM/GPRS | 1 |
| UMTS | 1 |
| Reserved for future type of GSM/GPRS/UMTS technology | 6 |

FIG. 5A

Table 8
MMSS Capability Parameter Block Type

| Parameter Block Type | Block_ID | Reference |
|---|---|---|
| Multi-RAT Capability Support | '00000000' | Table 5 |
| Reserved | '00000001' through '11111111' | |

Table 9

| Type Specific Record | Length |
|---|---|
| GSM_supported | 1 |
| UMTS_supported | 1 |
| WLAN_supported | 1 |
| Reserved for future type of access technologies | 6 |

FIG. 5B

Table 10

| Field | Length (bits) |
|---|---|
| MSPL_SIZE | 8 |
| MSPL_ID | 4 |
| NUM_MSPL_RECS | 8 |

Table 11
NUM_MSPL_RECS occurrences of the following field

| SYS_TYPE | 4 |
|---|---|
| PRI_CLASS | 4 |
| SYS_PRI | 1 |
| HIGHER_PRI_SRCH_TIME | 7 |

FIG. 6A

Table 12
System Type Definitions

| System Type | Value |
|---|---|
| CDMA2000 | 0000 |
| GSM | 0001 |
| UMTS | 0010 |

Table 13
NUM_MSPL_RECS occurrences of the following field

| SYS_TYPE | 4 |
|---|---|
| PRI_CLASS | 4 (see table 14) |
| SYS_PRI | 1 |
| SRCH_TIME_INCL | 1 |
| HIGHER_PRI_SRCH_TIME | 7 |

Table 14
PRI_CLASS Definitions

| 0000 | Home network only |
|---|---|
| 0001 | Home and preferred networks |
| 0010 | Any network |

FIG. 6B

METHODS AND APPLICATIONS FOR SUPPORTING RADIO ACCESS SYSTEM SELECTION BY MULTI-MODE MOBILE STATIONS

RELATED APPLICATION

This application claims the benefit of U.S. Provisional Patent Application No. 60/821,193 filed on Aug. 2, 2006, which is hereby incorporated by reference in its entirety.

FIELD OF THE APPLICATION

This application relates to radio access system selection by multi-mode mobile stations.

BACKGROUND

Multi-mode mobile stations are mobile stations (MS) that have the capability to access different types of radio access technology (RAT) networks. Existing multi-mode mobile stations include mobile stations with a combination of Global System for Mobile Communications/General Packet Radio Services (GSM/GPRS) and Code Division Multiple Access (CDMA) capabilities, and mobile stations with a combination of GSM/GPRS/Universal Mobile Telecommunications System (UMTS) and CDMA capabilities, and combinations that include wireless large area networks (WLAN) capabilities.

System selection algorithms provide an MS a method of finding a network best suited to the services subscribed to by the MS. System selection algorithms are used in every RAT. The network can assist the MS in selecting a suitable system such as GSM/GPRS, UMTS and CDMA. For example, in existing CDMA wireless systems, the MS uses an operator-supplied list called a PRL (Preferred Roaming List). The PRL describes which systems are permitted to be used and their associated priority in terms of preference, which systems are prohibited, and whether a system is considered as home or roaming. The PRL can be pre-provisioned during manufacture, or dynamically downloaded from the network via an over-the-air provisioning protocol, for example IS-683 OTASP/OTAPA. PRL is stored in the non-volatile memory of the MS or Removable User Identity Module (R-UIM). In existing GSM/GPRS/UMTS systems, instead of PRL, a PLMN (public land mobile network) list stored on the subscriber identity module (SIM) or a universal subscriber identity module (USIM) card is used by the network to indicate a preference of a system to the MS. PLMN list includes home PLMN, operator-controlled PLMNs and user-controlled PLMNs.

GPRS and UMTS are an evolution of GSM. Although GSM/GPRS and UMTS use different radio access technology, in some embodiments they are treated as a single category in terms of network acquisition since they share the same core network. In a CDMA network, SID (system identifier) identifies the associated CDMA carrier or operator and typically covers a large geographical area. The Network Identifier (NID) is a subset of SID and covers a smaller region such as an area covered by one MSC. In a GSM/GPRS/UMTS network, the Mobile Country Code (MCC) and the Mobile Network Code (MNC) identifies the associated PLMN or carrier. Within a PLMN, a Location Area Code (LAC) identifies the region covered by a given MSC/VLR (mobile-services switching center/visiting location register).

BRIEF DESCRIPTION OF THE DRAWINGS

Embodiments will now be described with reference to the attached drawings in which:

FIG. 3 is an example of a table containing multi-mode overlay information;

FIG. 4 is a set of tables showing how the multi-mode overlay information of FIG. 3 can be downloaded;

FIGS. 5A and 5B are a set of tables showing example data structures for a mobile station to signal to a system what its multi-mode capabilities are;

FIGS. 6A and 6B are a set of tables showing example data structures to aid a mobile station in selecting a system;

DETAILED DESCRIPTION OF THE EMBODIMENTS

Figure 1:
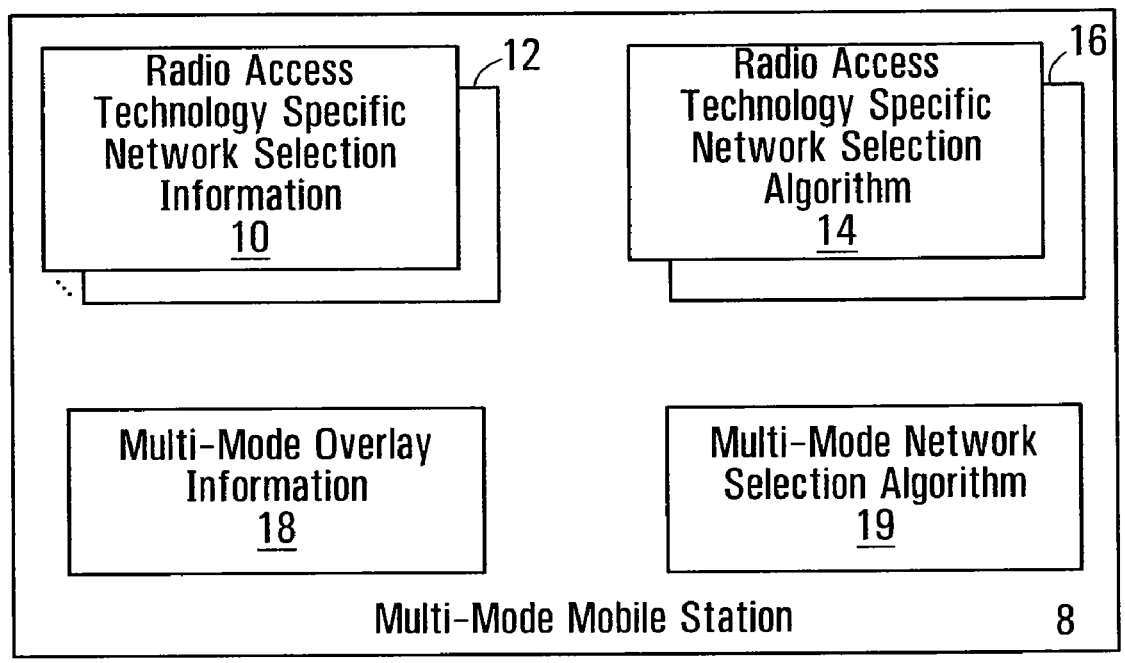
FIG. 1 is a block diagram of a multi-mode mobile station according to an embodiment of the application.

One broad aspect of the application provides a method for selecting a system comprising: a multi-mode mobile station performing multi-mode system selection using a multi-mode system selection algorithm as a function of multi-mode overlay information, the multi-mode overlay information comprising a plurality of associations, each association being between a respective set of systems that serve at least a common geographical area, at least some of the associations being between systems using differing radio access technology.

In some embodiments, the multi-mode overlay information comprises timing information in respect of searches to be conducted for systems, and wherein performing system selection comprises performing searches for systems in accordance with the timing information, wherein the timing information is provided in respect of some but not necessarily all of the systems, and the timing information includes an indication of for which systems timing information is provided, wherein the indication of for which systems timing information is provided comprises a respective bit for each system indicating the presence/absence of timing information for that system.

In some embodiments, wherein multi-mode overlay information comprises priority information for each system that prioritizes systems of each association, and wherein the multi-mode mobile station performing multi-mode system selection using a multi-mode system selection algorithm as a function of the multi-mode overlay information comprises: having acquired a system included in one of the sets of systems of the multi-mode overlay information, periodically attempting to connect to another system in the set of systems having a higher priority than the particular system if there is a higher priority system, the method further comprising: if the system that has been acquired is the highest priority system of the given system group, monitoring the system in an idle mode.

In some embodiments, the method further comprises the multi-mode mobile station receiving the multi-mode overlay information over the air.

In some embodiments, receiving the multi-mode overlay information over the air is in accordance with the format of the following tables:

TABLE A

| Field | Length (bits) |
|---|---|
| num_overlay_group | 4 |

TABLE B

| Field | Length (bits) |
|---|---|
| Group_id | 4 |
| System_id | See Table C |
| Specific_info | See Table D |
| Priority | 1 |
| | More: 1 |
| | Same: 0 |
| Search_time | 7 |

TABLE C

| Type Specific Record | Value |
|---|---|
| GSM | 0 |
| CDMA | 1 |
| WLAN | 2 |
| UMTS | 3 |

TABLE D

| Type Specific Record | Length (bits) |
|---|---|
| PLMN_LAC type | PLMN: 24 |
| | LAC: 16 |
| SID_type | SID: 15 |
| | NID: 16 |
| SSID_type | 8 |

In some embodiments, the method further comprises the mobile station transmitting multi-mode capability information.

In some embodiments, transmitting multi-mode capability information comprises: transmitting at least one bit for each of a plurality of radio access technologies indicating whether each radio access technology is supported.

In some embodiments, transmitting at least one bit for each of a plurality of radio access technologies indicating whether each radio access technology is supported comprises: transmitting at least one bit for each of CDMA, GSM/GPRS/UMTS, and WLAN.

In some embodiments, the method further comprises: if CDMA is supported, also transmitting at least one bit indicating support for each of CDMA 1× and CDMA 1×EVDO individually; if GSM/GPRS/UMTS is supported, also transmitting at least one bit for each of GSM, GPRS, and UMTS individually.

In some embodiments, transmitting at least one bit for each of a plurality of radio access technologies indicating whether each radio access technology is supported comprises: transmitting at least one bit for each of GSM and WLAN, with an assumption that CDMA is supported.

In some embodiments, OTASP (over the air service programming)/OTAPA (over the air parameter administration) messages are used to request and transmit multi-mode capability information.

In some embodiments, transmitting at least one bit for each of a plurality of radio access technologies indicating whether each radio access technology is supported is performed in accordance with the format of the following table:

| Type Specific Record | Value |
|---|---|
| GSM/GPRS/UMTS_Support | 0: GSM/GPRS/UMTS not supported |
| | 1: GSM/GPRS/UMTS supported |
| CDMA_Support | 0: 1x/1xEVDO not supported |
| | 1: 1x/1xEVDO supported |
| WLAN_Support | 0: WLAN not supported |
| | 1: WLAN supported |
| Reserved | |

In some embodiments, if CDMA is supported, the mobile station transmits multi-mode capability information in accordance with the format of the following table:

| Type Specific Record | Length (bits) |
|---|---|
| CDMA 1X | 1 |
| 1X EVDO | 1 |
| Reserved for future type of CDMA technology | 6 |

In some embodiments, if GSM/GPRS/UMTS is supported, the mobile station transmits multi-mode capability information in accordance with the format of the following table:

| Type Specific Record | Length (bits) |
|---|---|
| GSM | 1 |
| GPRS | 1 |
| UMTS | 1 |

In some embodiments, the multi-mode capability overlay information comprises timing information in respect of searches to be conducted for systems.

Another broad aspect of the application provides a method comprising: a system preparing multi-mode overlay information, the multi-mode overlay information comprising a plurality of associations, each association being between a respective set of systems that serve at least a common geographical area, at least some of the associations being between systems using differing radio access technology; the system sending the multi-mode overlay information to the mobile station.

In some embodiments, the method further comprises: the system receiving the multi-mode capability-information from the mobile station; wherein multi-mode overlay information comprises customized multi-mode overlay information for each mobile station that includes only systems of radio access technologies supported by the mobile station.

Another broad aspect of the application provides an apparatus comprising: a multi-mode system selection function for performing multi-mode system selection as a function of multi-mode overlay information, the multi-mode overlay information comprising a plurality of associations, each association being between a respective set of systems that serve at least a common geographical area, at least some of the associations being between systems using differing radio access technology; a memory for storing multi-mode overlay information; and a wireless access radio for accessing systems having one or more radio access technologies.

In some embodiments, the multi-mode system selection function comprises at least one of a radio access technology specific network selection function for performing network selection for a given radio access technology and a multi-mode network selection function for performing network selection from a plurality of different radio access technologies.

Yet another broad aspect of the application provides a computer readable medium storing program instructions executable by a processor of a computing device for causing said computing device to perform the methods described above.

In accordance with an embodiment of the application, multi-mode overlay information is provided to multi-mode mobile stations. The multi-mode overlay information provides a list of networks or systems for various radio access technologies that are available in an overlapping geographical area.

Referring now to FIG. 1, shown is a block diagram of an example of a mobile station 8. The mobile station 8 has a memory for storing radio access technology-specific network selection information 10, . . . , 12 for multiple radio access technologies. In addition, for each radio access technology, there is a respective radio access technology-specific network selection algorithm 14, . . . , 16. Also shown is multi-mode overlay information 18 which is stored in a memory on the multi-mode mobile station 8, and a multi-mode system selection algorithm 19. The mobile station 8 of course has other functionality not shown in the interest of simplifying the drawings. This would include, for example, access radios, processors, memory, antennas, etc. The radio access technology-specific network selection algorithms 14, . . . , 16 and the multi-mode network selection algorithm 19 can be implemented using one of a suitable combination of, for example software, hardware and firmware.

In operation, for each radio access technology (RAT), the radio access technology-specific network selection information 10, . . . , 12 and the radio access technology-specific network selection algorithm 14, . . . , 16 work in concert in a conventional fashion to perform network selection for that technology. At the same time, the multi-mode network selection algorithm 19 operates as a function of the multi-mode overlay information 18 to perform network selection where a choice between multiple different radio access technologies needs to be made.

Figure 2:
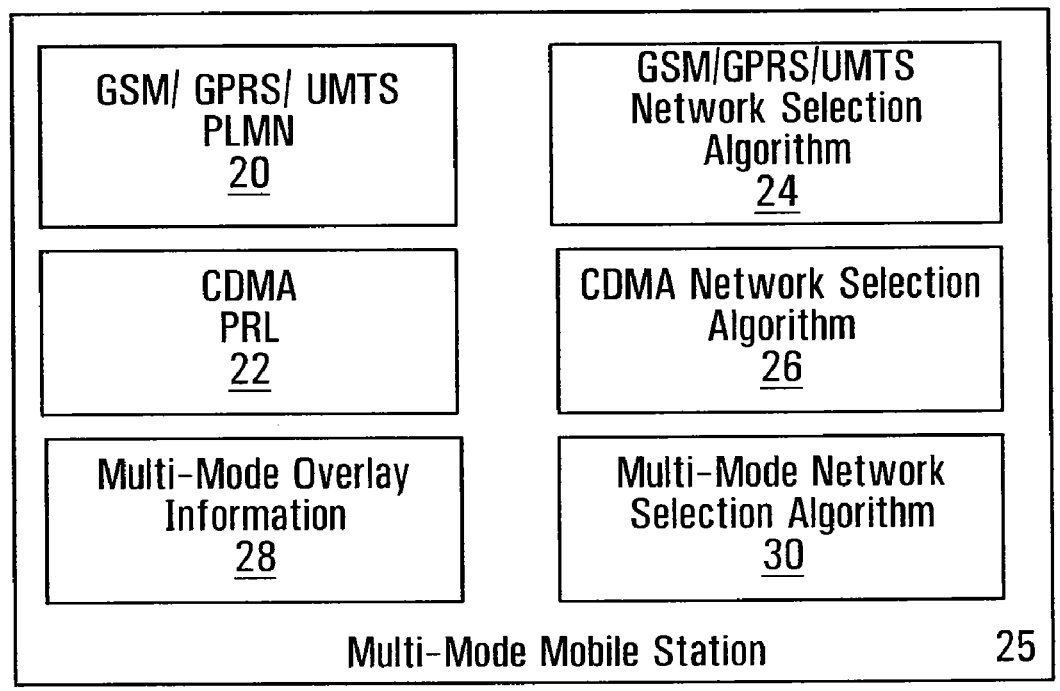
FIG. 2 is a block diagram of a multi-mode mobile station operating in CDMA and GSM/GPRS/UMTS modes according to an embodiment of the application.

Referring now to FIG. 2, shown is a particular example of the multi-mode mobile station of FIG. 1 where the mobile station in FIG. 2 is generally indicated at 25 and is equipped to operate using a CDMA radio access technology and a GSM/GPRS/UMTS radio access technology. For GSM/GPRS/UMTS, the mobile station has a GSM/GPRS/UMTS PLMN list 20 and for CDMA, the mobile station has a CDMA PRL 22. There is a GSM/GPRS/UMTS network selection algorithm 24 that operates to perform network selection using the GSM/GPRS/UMTS PLMN list 20, and there is a CDMA network selection algorithm 26 that performs CDMA network selection using the CDMA PRL 22. Also shown is multi-mode overlay information 28 and multi-mode network selection algorithm 30 that perform selection between CDMA and GSM/GPRS/UMTS radio access technology.

Referring now to FIG. 3, shown is a very specific example of multi-mode overlay information organized in a table 41. This table contains a number of systems organized into overlay groups, two 40,42 shown in the illustrated example. Each overlay group represents an association between a respective set of systems. Each system of the set of systems includes one or more different RAT types. Therefore, in some implementations, more than one system in a common geographical area may have a same RAT type, allowing the mobile station to select a particular RAT in one of several systems.

The table 41 has columns identified with headings "Index" 43, "Overlay Group Number" 45, "Intra-Group Priority" 44, "Higher Priority Network Search Time (example 1)" 46 and "Higher Priority Network Search Time (example 2)" 47. Another column with a heading "System Info" includes the further headings "System Type" 48 and "Specific Info" 49. The "System type" column 48 identifies the type of system for each system listed. The system types might for example include CDMA and GSM, GPRS, UMTS and WLAN. In some embodiments GSM/GPRS/UMTS are grouped together as a single system type. More generally, any appropriate mechanism of identifying the various system types can be employed.

The first overlay group 40, identified by "0" in "Overlay Group Number" column 45 contains three different systems, namely a CDMA system, a GSM system and a UMTS system. Specifically, as identified in the "Specific Info" column 49 these are CDMA system with SID/NID (system identifier/network identifier) (6,1), GSM system with MCC/MNC/LAC (mobile country code/mobile network code/location area code) 350/22/2, and UMTS system with MCC/MNC/LAC 350/22/3. The second overlay group 42 identified by "1" in "Overlay Group Number" column 45 contains three systems, these consisting of a CDMA system, a GSM system and a wireless LAN. Specifically, as identified in the "Specific Info" column 49 these are CDMA system with SID/NID (6,2), GSM system with MCC/MNC/LAC 350/22/3, and WLAN system with an SSID (service set identifier). For each of the systems, there is a respective set of identification parameters. In the particular example illustrated, for each CDMA system the identification parameters include the SID and the NID. In some embodiments, the additional identification parameters for the CDMA system include the MCC and the MNC. For each GSM/GPRS/UMTS system in the illustrated example, the identification parameters include the MCC, the MNC and the LAC. In some embodiments, the identification parameters for the GSM/GPRS/UMTS system include only the MCC or the MCC and the MNC. Finally, for a wireless LANs the identification parameters consist of the SSID. In some embodiments, the multi-mode overlay information includes intra overlay group priority information as indicated at column 44 in FIG. 3. Any appropriate mechanism for indicating the relative priority of the systems within an overlay group can be employed. In the illustrated example, only two different priorities are listed, and these priorities are in respect of sequentially ordered records within the table. More particularly, a "more" indication for a given system means that system has a higher priority than the previous system in the table, while a "same" indication for a given system means that system has the same priority as the previous system in the table.

In overlay group 40 of the illustrated example the system with the highest priority (CDMA) has an Intra-Group Overlay Priority identification "more" and the other two systems (GSM, UMTS) have an Intra-Group Overlay Priority identification "same" as they have a similarly lower priority. In overlay group 42 of the illustrated example the system with the highest priority (CDMA) has an Intra-Group Overlay Priority identification "more". A system (GSM) with priority lower than the highest priority system (CDMA), but higher than the system with the lowest priority (WLAN) also has an Intra-Group Overlay Priority identification "more". The system with the lowest priority (WLAN) has an Intra-Group Overlay Priority identification "same".

In some embodiments, the multi-mode overlay information includes timing information that specifies the timing of the searches to be conducted for various system types. This timing information can come in various forms. In some embodiments, the timing information is a set of bits that indicates an actual timer value, for example in minutes. In some embodiments, the timing information is a set of bits that indicates an actual timer value, for example in minutes, offset by a predetermined value. For example, if a timer will not have a value less than 2, then the timer value can be offset by 2 (i.e. timing information equals the timer value to be used minus 2) so that fewer bits are used to convey the timing information. In some embodiments, the timing information is a set of bits that index into a table previously stored on the mobile station containing a set of timer values.

In some embodiments, the timer information is in respect of each system identified in the multi-mode overlay information. In some embodiments, the timer information indicates for a given system, while that system has been acquired, how often to search for a system with higher priority than the given system and with a different RAT than the RAT of the given system. An example of this approach is shown in FIG. 3 in the column 46 entitled "Higher Priority Network Search Time (example 1)". Column 46 contains a parameter that indicates for each system listed in the table how often to look for a higher priority system. For example, the parameters specific in the table stipulate that while a given mobile station has acquired the UMTS system identified by MCC=350, MNC=22 and LAC=3, the mobile station will look for a higher priority system of a different RAT type every five minutes. In this case, it will search for the CDMA system. Similarly, while a given mobile station has acquired the GSM system identified by MCC=350, MNC=22 and LAC=2, the mobile station will look for a higher priority system (the CDMA system in the illustrated example) every ten minutes. This approach provides the flexibility of providing a different timer value even for systems of the same RAT.

For such systems, in some embodiments, when the timer expires, all of the higher priority systems are searched for, for example starting with the highest priority system. In other embodiments, only the highest priority system is searched for.

In yet another implementation, for each system listed, multiple timers are specified each specifying a search period for a respective higher priority system than the listed system.

In some embodiments, the timer information is in respect of each entry in the table to be searched for. In some embodiments, the timer specifies for a given type of system included in the overlay information, the time between searches of this type of system that the mobile station is to use when searching for this type of system as a higher priority system than the current system. An example of this is shown in FIG. 3 in the column 47 entitled "Higher Priority Network Search Time (example 2)".

Column 47 contains a parameter that indicates for each system listed in the table how often to look for that system as a higher priority system. For example, the particular parameter values in the table stipulate that so long as a given mobile station has not acquired the CDMA system with SID/NID=6/1, the mobile station should search for the CDMA system with SID/NID=6/1 every 5 minutes. Similarly, so long as a given mobile station has not acquired the CDMA system with SID/NID=6/1, and has not acquired the GSM system with MCC/MNC/LAC=350/22/2, the mobile station should search for the GSM system with MCC/MNC/LAC=350/22/2 every 10 minutes. As the UTMS system has the lowest priority, there is no time indicated for how often a search is performed.

In some embodiments, respective timing information is not provided for each and every network; rather, timing information is provided for some networks, and one or more bits are used to signal the presence or absence of such information. A specific example of this is given below in Table 13 of FIG. 6B. With such an approach, timing information is not included for certain entries in each group, for example the highest priority entry. In some embodiments, default values (that might for example be defined per RAT type) could be used for subsequent entries if the timing information were not included.

In some embodiments, upon power up when a multi-mode mobile station is turned on, the multi-mode mobile station will search for a suitable system by looking for a RAT that matches the most recently used RAT, for example if the mobile station has a valid acquisition history that includes recently used RATs. Otherwise, the mobile station will use a default RAT search setting to look for a suitable system. The radio access technology specific network selection algorithm is used at this point.

A specific usage scenario will now be described with reference to the values in the table of FIG. 3, specifically with regard to "Higher Priority Network Search Time (example 1)" 46, in which it is assumed that the mobile station has a default RAT setting of CDMA. The mobile station will search for a CDMA system based upon the CDMA PRL first. If the mobile station is in overlay group "0" as defined in "Overlay Group Number" 45, the mobile station acquires the CDMA system and reads "System Info", in particular the "Specific Info" 49 to retrieve SID/NID information. In this example, it is assumed that the mobile station acquires the CDMA system with SID/NID=6/1. With the SID/NID information thus obtained, the mobile station then checks the multi-mode overlay information to see if there are any higher priority systems. It can be seen that in this case, since CDMA is the most preferred system, the mobile station will camp on the CDMA system without needing to look for other systems.

On the other hand, if the default RAT setting of the mobile station is GSM/GPRS/UMTS, the mobile station will search for the GSM/GPRS/UMTS system based upon the GSM/GPRS/UMTS PLMN list first. If the mobile station is at overlay group "0" as defined in "Overlay Group Number" 45, the mobile station acquires a GSM/GPRS/UMTS system and reads "System Info", in particular the "Specific Info" 49 to retrieve MCC/MNC/LAC information. With MCC/MNC/LAC information available, the mobile station knows the available RAT in the area by checking the multi-mode overlay information. Specifically, assuming the mobile station has acquired the GSM/GPRS/UMTS system with MCC/MNC/LAC=350/22/2, RAT type information can be found in the multi-mode overlay information in association with overlay group "0". Since there is a CDMA system (namely the system with SID/NID=6/1) indicated to be the most preferred system, the mobile station will perform periodic system selection to try to acquire the CDMA system.

Figure 7:
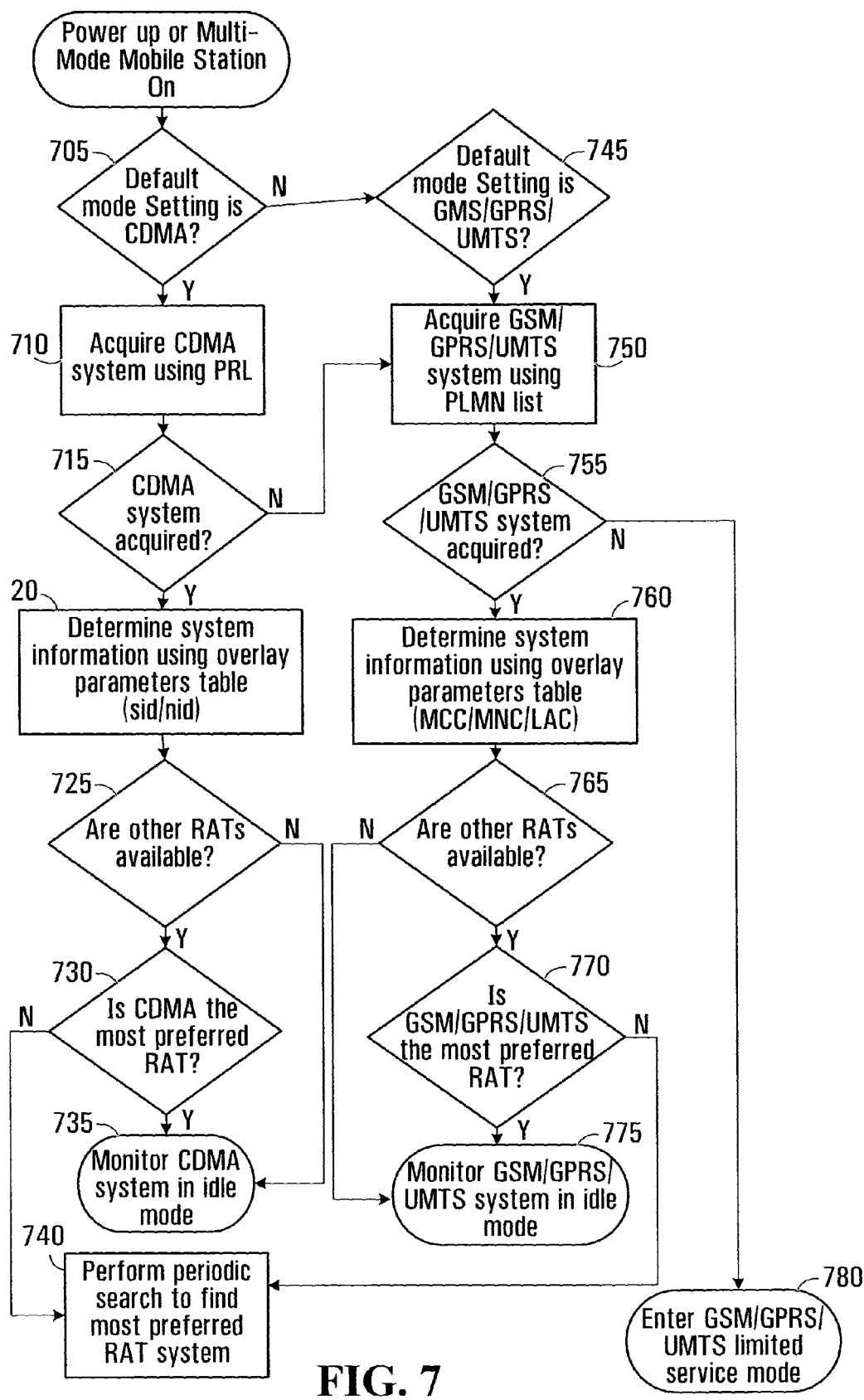
FIG. 7 is a detailed flowchart of an example method of performing system selection.

FIG. 7 gives a detailed example for the multi-mode mobile station power up system selection behavior. An assumption for the FIG. 7 example is that the mobile station is a dual-mode mobile station that supports CDMA and GSM/GPRS/UMTS radio access technologies.

After the multi-mode mobile station is powered up, a first step 705 is a decision step for determining if a default mode setting is CDMA. If the default mode setting is CDMA (yes path), the multi-mode mobile station attempts to acquire a CDMA system using a PRL at step 710. Step 715 is another decision step to determine whether a CDMA system has been acquired. If a CDMA system has been acquired (yes path), the multi-mode mobile station determines system information from the overlay parameters table, for example SID/NID information at step 720. Step 725 is a decision step following step 720 to determine based on overlay parameters for a common geographic area whether other RAT systems are available. If other RAT systems are available (yes path), step 730 is a decision step for determining if CDMA is the most preferred RAT of those systems available. If CDMA is the most preferred RAT (yes path) then the multi-mode mobile station monitors the CDMA system in an idle mode at step 735. If CDMA is not the most preferred RAT (no path of step 730) then the multi-mode mobile station performs a periodic search to find a most preferred RAT system at step 740. If other RATs are not available (no path of step 725), the multi-mode mobile station monitors the CDMA system in the idle mode at step 735.

If the default mode setting is not CDMA (no path of step 705), step 745 is a decision step for determining if a default mode setting is GSM/GPRS/UMTS. If the default mode is GSM/GPRS/UMTS at step 745 (yes path), at step 750 the multi-mode mobile station attempts to acquire a GSM/GPRS/UMTS system using a PLMN list. If a CDMA system has not been acquired at step 715 (no path of step 715), then the multi-mode mobile station attempts to acquire a GSM/GPRS/UMTS system using a PLMN list at step 750. Step 755 is a decision step following step 750, which involves determining if a GSM/GPRS/UMTS system has been acquired. If a GSM/GPRS/UMTS system has been acquired (yes path), the multi-mode mobile station determines system information using the overlay parameters table, for example MCC/MNC/LAC information at step 760. If a GSM/GPRS/UMTS system has not been acquired (no path of step 755), the multi-mode mobile station at step 780 enters a GSM/GPRS/UMTS Limited Service mode. A Limited Service mode, sometimes referred to as an SOS mode, is an emergency mode in which the mobile station is only allowed to make calls for emergency services. Step 765 is a decision step following step 760 to determine based on overlay parameters for a common geographic area whether other RAT systems are available. If other RAT systems are available (yes path), step 770 is a decision step for determining if any one of GSM/GPRS/UMTS is the most preferred RAT of those systems available. If any one of GSM/GPRS/UMTS is the most preferred RAT (yes path) then the multi-mode mobile station monitors a given one of a GSM/GPRS/UMTS system in an idle mode at step 775. If any one of GSM/GPRS/UMTS is not the most preferred RAT type (no path of step 770) then the multi-mode mobile station performs a periodic search to find a most preferred system at step 740. If other RATs are not available (no path of step 765), the multi-mode mobile station monitors a given one of a GSM/GPRS/UMTS system in the idle mode at step 775.

In some embodiments, the overlay information only includes system configuration information if more than one RAT type is available at a certain geographic area. For example, if only a CDMA system is available or if only a GSM/GPRS/UMTS system is available in one area, the overlay information for the system is not included in the overlay information. This reduces the size of the overlay information that is maintained.

In some embodiments, the overlay information is downloaded to the mobile station using OTASP/OTAPA (over-the-air service provisioning/over-the-air parameter administration) messages. In some embodiments new OTASP/OTAPA messages include an Overlay Information Download Request Message and an Overlay Information Download Response Message. In some implementations, an over-the-air provisioning server (OTA server) may be responsible for overlay parameter table downloading together with other over-the-air provisioning parameters (e.g. PRL table). For example, if a user dials *228 on a mobile station indicating that the mobile station requires over-the-air provisioning parameter downloading, the OTA server will download the overlay parameter table together with other over-the-air messages to the device. The overlay parameters are downloaded at one time as a table.

FIG. 4, shows a very specific example of the format that might be used for such messages.

Table 1 is an example of a data structure for the download request message format sent by the network. Table 1 includes an identification of a single field, "num_overlay_group" which is a number of overlay groups. Table 1 also defines a specific length of the field to be four bits, but more generally, the length of the field is implementation specific.

Tables 2 to 4 are examples of data structures that are included in the download request message sent by the network.

Table 2 indicates for each of the overlay groups various parameters defining the respective overlay groups and defining the length of the fields of each of the various respective parameters. The various parameters include a group identification "Group_id" having a length of four bits, a system type "System_type" having a length of two bits. Specific examples of the format of the "System_type" are further defined in Table 3 of FIG. 4. Specific examples of the "Specific_info" are further defined in Table 4 of FIG. 4. Further parameters in Table 2 include an intra-group priority "priority" having a length of one bit, and a higher priority network search time "Search_time" having a length of seven bits.

The "priority" field may include, for example a "1" for "more" and a "0" for "same" in defining the priority, as described above with regard to Table 1. In some embodiments, the "Search_time" field includes a time in minutes as described above with regard to Table 1.

In some implementations, the "Search_time" field is represented using fewer bits. For example, a 3-bit value is defined to represent the "Search_time" from 1 minute to 64 minutes as follows:

| Bit Value | Time (minutes) |
|-----------|----------------|
| 000 | 1 |
| 001 | 2 |
| 010 | 4 |
| 011 | 8 |
| 100 | 16 |
| 101 | 24 |
| 110 | 32 |
| 111 | 64 |

Table 3 contains examples of "System type" information in which a GSM system has a value of "0", a CDMA system has a value of "1" and a WLAN system has a value of "2" and a UMTS system has a value "3". These values could respectively be represented by two bit sequences "00", "01", "10" and "11". Types of systems are not intended to be limited to the four types included in Table 3. Other system types may include, for example GPRS. The bit values associated with system type are implementation specific.

Table 4 contains examples of "Specific_info" information pertaining to a network having the type identified by the "System_type" field described above. In the examples depicted for GSM, the specific information is a PLMN and a LAC in a "PLMN_LAC type" field in which for the PLMN the field is twenty-four bits and for the LAC the field is sixteen bits. For CDMA, the "Specific_info" information includes SID and NID type information "sid_nid_type" in which for the SID the field is fifteen bits and for the NID the field is sixteen bits. For WLAN, the specific information in Table 4 is SSID type information "ssid_type" which is eight bits in length.

It is to be understood that the names and number of bits of the various fields in Tables 2, 3 and 4 are implementation specific and not intended to be limited to the names and number of bits in the illustrated examples. Furthermore, in some implementations, additional fields to those described above may be included that include additional information useful in radio access system selection.

The overlay group number in Table 1 of FIG. 3 is a very specific mechanism of defining an association between sets of systems that serve a common geographical area. More generally, the multi-mode overlay information can include a plurality of associations, each association being between a respective set of systems that serve at least a common geographical area, and these associations can be defined using any appropriate mechanism.

As described above, in some embodiments, even while multi-mode system selection is being performed, system selection is performed in parallel using a radio access technology-specific system selection algorithm. Thus, while a mobile station has currently acquired a CDMA system, multi-mode system selection can be performed to identify an available GSM/GPRS/UMTS system, and radio access technology-specific system selection can be performed to select another CDMA system, for example using a PRL-based algorithm. Similarly, for a mobile station that has acquired a GSM/GPRS/UMTS system, the multi-mode system selection is employed to look for a CDMA system, and at the same time the GSM/GPRS/UMTS PLMN list can be used to look for another GSM/GPRS/UMTS system.

Thus, a multi-mode mobile station will perform two types of system selection: one type of system selection is to perform periodic system selection to find a most preferred same RAT system; another type of system selection is to perform inter-RAT system selection in the overlay geographic area. In some embodiments finding a most preferred same RAT system is performed in accordance with current standards for CDMA and GSM/GPRS/UMTS.

In some embodiments, where timer values are such that a search based on the multi-mode overlay information is to be performed at the same time as a search based on a radio access technology specific search algorithm, priority is given to the search based on the radio access technology specific search algorithm. For example, having acquired a CDMA system, the PRL may specify searching for another CDMA system at a specific time, and the multi-mode overlay information may specify searching for a UMTS system at a specific time that is simultaneous with the PRL-based search. In this case, the PRL-based search is given priority.

In some embodiments, a respective PLMN list is associated with each of GSM, GPRS, and UMTS. This might be stored in a subscriber identity module (SIM) card used in the multi-mode mobile station for example. In other embodiments, the same PLMN list can be used for one or more of GSM, GPRS, and UMTS for system selection.

In some embodiments, a mobile station's multi-mode or multi-RAT capability information is used to support multi-mode system selection. The information can be implemented, for example, by adding new CDMA OTASP/OTAPA messages.

A specific example of the mobile station's multi-RAT capability information is defined in FIG. 5A.

In some embodiments, the network queries the mobile station's multi-RAT capability by sending OTASP/OTAPA messages. In some embodiments new OTASP/OTAP messages include a Multi-Mode System Selection (MMSS) Capability Request Message and Multi-Mode System Selection (MMSS) Capability Response Message.

FIG. 5A includes Tables 5-7, in which Table 5 includes a respective row indicating the support for each of GSM/GPRS/UMTS, CDMA, and WLAN respectively, Table 6 includes further details of which types of CDMA RAT are supported, and Table 7 includes further details of which types of GSM/GPRS/UMTS RAT are supported.

Referring now specifically to Table 5, there is a type specific record for each of GSM/GPRS/UMTS, CDMA, and WLAN. Each record has a "value" field that indicates whether or not that type is supported. In the particular example illustrated, for GSM/GPRS/UTMS, a "0" value indicates that GSM/GPRS/UTMS is not supported and a "1" indicates that GSM/GPRS/UTMS is supported. For a value of "1", Table 7 includes further details of which specific GSM/GPRS/UTMS RAT types are supported. For CDMA, a "0" value indicates there is no support for either 1× or 1×EVDO CDMA, while a "1" value indicates support for one or both of 1× or 1×EVDO CDMA. For a value of "1", Table 6 includes further details of which specific CDMA RAT type(s) are supported.

For WLAN, a "0" value indicates that WLAN is not supported and a "1" value indicates that WLAN is supported.

For the specific example of Table 5, the multi-RAT capability support can be represented by three bits in total, one bit for indicating whether each of GSM/GPRS/UTMS, CDMA and WLAN is supported.

Referring now to Table 6, this includes further information where the multi-RAT capability support indicates that CDMA is supported. In the particular example illustrated, an 8 bit field is used, with one bit indicating whether 1×CDMA is supported or not, and one bit indicating whether 1×EVDO CDMA is supported. This leaves six bits available for further types of CDMA technology to be identified.

Referring now to Table 7, this includes further information where the multi-RAT capability support indicates that GSM/GPRS/UMTS is supported. In the particular example illustrated, an 8 bit field is used, with one bit indicating whether GSM/GPRS is supported or not and one bit indicating whether UMTS is supported. This leaves six bits available for further types of GSM/GPRS/UMTS technology to be identified.

The MMSS Capability Request Message is used by the network to query the mobile station's configuration. In some embodiments multi-RAT capability support is one of the network's query block types, for example as defined in FIG. 5B. Upon receiving the MMSS Capability Request Message, the mobile station will respond with the MMSS Capability Response Message indicating its supported multi-RAT capability.

Table 9 in FIG. 5B is another detailed example of how multi-RAT capability support can be indicated. In Table 9, there is a type specific record for each system type, namely GSM, UMTS and WLAN. In the illustrated example, a nine bit field is used, with one bit indicating whether GSM is supported or not, one bit indicating whether UMTS is supported or not, and one bit indicating whether WLAN is supported or not. This leaves six bits available for further types of GSM/GPRS/UMTS technology to be identified.

When the field "GSM_SUPPORTED" is set to '1' this indicates that the mobile station is capable of supporting GSM; otherwise this field is set to '0'. When the field "UMTS_SUPPORTED" is set to '1' this indicates that the mobile station is capable of supporting UMTS; otherwise this field is set to '0'. When the field "WLAN_SUPPORTED" is set to '1' this indicates that the mobile station is capable of supporting WLAN; otherwise this field is set to '0'.

Table 9 is different from Table 5 in FIG. 5B in that CDMA is not included and GSM and UMTS are indicated separately rather than having additional fields to indicate these RAT types from a group of GSM/GPRS/UTMS. In other implementations, capability support can be indicated in a similar manner to the specific combination of Table 9, but with other combinations of RAT types.

In some embodiments, based upon a mobile station's multi-RAT capability indication, the system's configuration downloading could become more flexible. For example, if a mobile station indicates that it only supports CDMA and GSM/GPRS technology, the system only needs to download CDMA and GSM/GPRS related system configuration even for areas that include other radio access technologies. For example, the system can exclude UMTS information, even if UMTS would otherwise be included in one or more overlay groups. Referring to FIG. 3, a mobile station that has CDMA, GSM and WLAN capabilities and that does not have UMTS capabilities is sent a prepared version of the multi-mode overlay information that includes only CDMA, GSM and WLAN systems. This would involve omitting the UMTS system from overlay group "0". This reduces the over-the-air message length and saves parameter storage in the mobile station's memory.

In some embodiments, with the knowledge of a mobile station's multi-RAT capability, the system downloads different system configuration sets or other information that may be needed by the mobile station to facilitate the mobile station's system selection or other RAT related functionality.

With the evolution of wireless systems, more information could be added to the MMSS overlay information to facilitate the mobile station to perform system selection, as well as other multi-RAT associated functionalities.

The description has focussed on multi-mode mobile stations that have the capability to access different types of radio access technology systems. Existing multi-mode mobile stations include mobile stations with combinations of one or more of GSM, GPRS, UMTS, WLAN and CDMA capabilities. More generally, other embodiments are applicable to multi-mode mobile stations utilizing other RAT types, as well as those listed above.

In some implementations a MSPL (MMSS System Priority List) assists a multi-mode mobile station in selecting a system. The MSPL is a prioritized list of cellular systems. In some embodiments, the cellular systems are CDMA2000 and non-CDMA2000 systems. In some embodiments, once a system is selected, the multi-mode mobile station follows the standard network selection procedures for the selected system to acquire a network. In some embodiments, the MSPL is sent to the multi-mode mobile station using OTASP. In some embodiments, the MSPL is retained by the multi-mode mobile station when the multi-mode mobile station is turned off. In some embodiments, the timer that was introduced above in relation to FIG. 3, provides timing information to the MSPL.

FIGS. 6A and 6B include Tables 10 to 13, which are examples of data structures used to describe the MSPL in further detail. Table 10 includes information related to the size, manner of identification and contents of the MSPL. Tables 11 and 13 include information related to each of the MSPL records in the MSPL and Table 12 includes information further defining the information in Tables 11 and 13.

Table 10 is an example of information included in the MSPL. The example MSPL contains multiple fields that define the size, particular identification, and number of records in the MSPL. Table 10 also indicates a respective size in bits for each field. Particular field sizes are identified in Table 10, but the field sizes, and thus the overall MSPL size is implementation specific.

A first field in Table 10 is "MSPL_SIZE". The "MSPL_SIZE" field defines the MSPL size. In some embodiments, the field is set to the total size, in octets, of the MSPL, including the MSPL_SIZE field. In the illustrated example this field is 8 bits in length.

A second field is "MSPL_ID". The "MSPL_ID" field defines the MSPL identification. In some embodiments, the multi-mode mobile station sets this field to a value of a MSPL Identification assigned for the MSPL by the base station. In the illustrated example this field is 4 bits in length.

A third field is "NUM_MSPL_RECS". The "NUM_NMSPL_RECS" field defines a number of MMSS system priority records. This field is set to the number of MMSS system priority records contained in the MSPL. In the illustrated example this field is 8 bits in length.

A specific example of a MMSS priority record is shown in Table 11. There is an occurrence of the group of fields contained in Table 11 for each of the number of MMSS priority records defined in the "NUM_NMSPL_RECS" field.

A first field in Table 11 is "SYS_TYPE". The "SYS_TYPE" field defines a system type identification. The system type may, for example be specified in accordance with the entries in Table 12, which is described below. In the illustrated example this field is 4 bits in length.

A second field in Table 11 is "PRI_CLASS". The "PRI_CLASS" field identifies a network acquisition priority for the multi-mode mobile station network selection procedure of a preferred system type. In an example implementation, four bits are used in the "PRI_CLASS" field. Table 14 includes a list of options for the "PRI_CLASS" field. The value '0000' is used for selecting the home network of the mobile station only, '0001' is used for home network and preferred networks of the mobile station and '0010' is used for any network in the system. In the illustrated example this field is 4 bits in length.

A third field in Table 11 is identified as "SYS_PRI". The "SYS_PRI" field indicates the relative priority of systems in the MSPL. In some embodiments, the relative priority is indicated as 'more' by a '1' bit or 'same' by a '0' bit. For example, for each entry of a '1' the current system type is of higher priority than the next system type in the table and for each entry of a '0' the current system type is of same priority as the next system type in the table. In some embodiments, the last entry in the MSPL has the system priority set to '0'. In the illustrated example this field is 1 bit in length.

A fourth field in Table 11 is "HIGHER_PRI_SRCH_TIME". The "HIGHER_PRI_SRCH_TIME" field contains Higher Priority Search Time information. In some embodiments, the "HIGHER_PRI_SRCH_TIME" field is set to the time between searches of this type of system that the mobile station is to use when searching for this system as a higher priority system than the current system. In the illustrated example this field is 7 bits in length. In other embodiments, the "HIGHER_PRI_SRCH_TIME" field may include timing information having any of the forms described above. For example, the "HIGHER_PRI_SRCH_TIME" field may only be 3 bits in length defining times of 1 minute to 64 minutes as described above. In some embodiments, any of the previously introduced search information can be employed here.

Table 12 includes a list of different types of systems that could be used in the "SYS_TYPE" field in Tables 11 and 13 and respective four bit values associated with the different types of systems. In the illustrated example, CDMA2000 has an associated value "0000", GSM has an associated value "0001" and UMTS has an associated value "0010". In some embodiments, the value "0001" is associated with GSM/GPRS. Types of systems are not intended to be limited to the three types included in Table 12. Other system types may include, for example WLAN, GPRS, and GSM. The values associated with system type are implementation specific.

As indicated previously, in some embodiments, respective timing information is not provided for each and every network; rather, timing information is provided for some networks, and one or more bits are used to signal the presence or absence of such information. A specific example of this is shown in Table 13.

Table 13 contains the same fields as Table 11 and also includes a "SRCH_TIME_INCL" field. The "SRCH_TIME_INCL" field indicates whether Higher Priority Search Time information is included for that system or not. In the illustrated example, the "SRCH_TIME_INCL" field is indicated by a single bit. If the single bit is "1", then Higher Priority Search Time information is included and if the single bit is "0", then Higher Priority Search Time information is not included. The manner of indicating whether Higher Priority Search Time information is included for that system or not is implementation specific. In the illustrated example this field is 1 bit in length.

The names of the fields and number of bits of the fields in Tables 10, 11, 12, 13 and 14 are implementation specific and not intended to be limited to the names and number of bits in the illustrated examples. For example the "PRI_CLASS" field in Tables 11 and 13 may be referred to as "PRI_NET".

Figure 11:
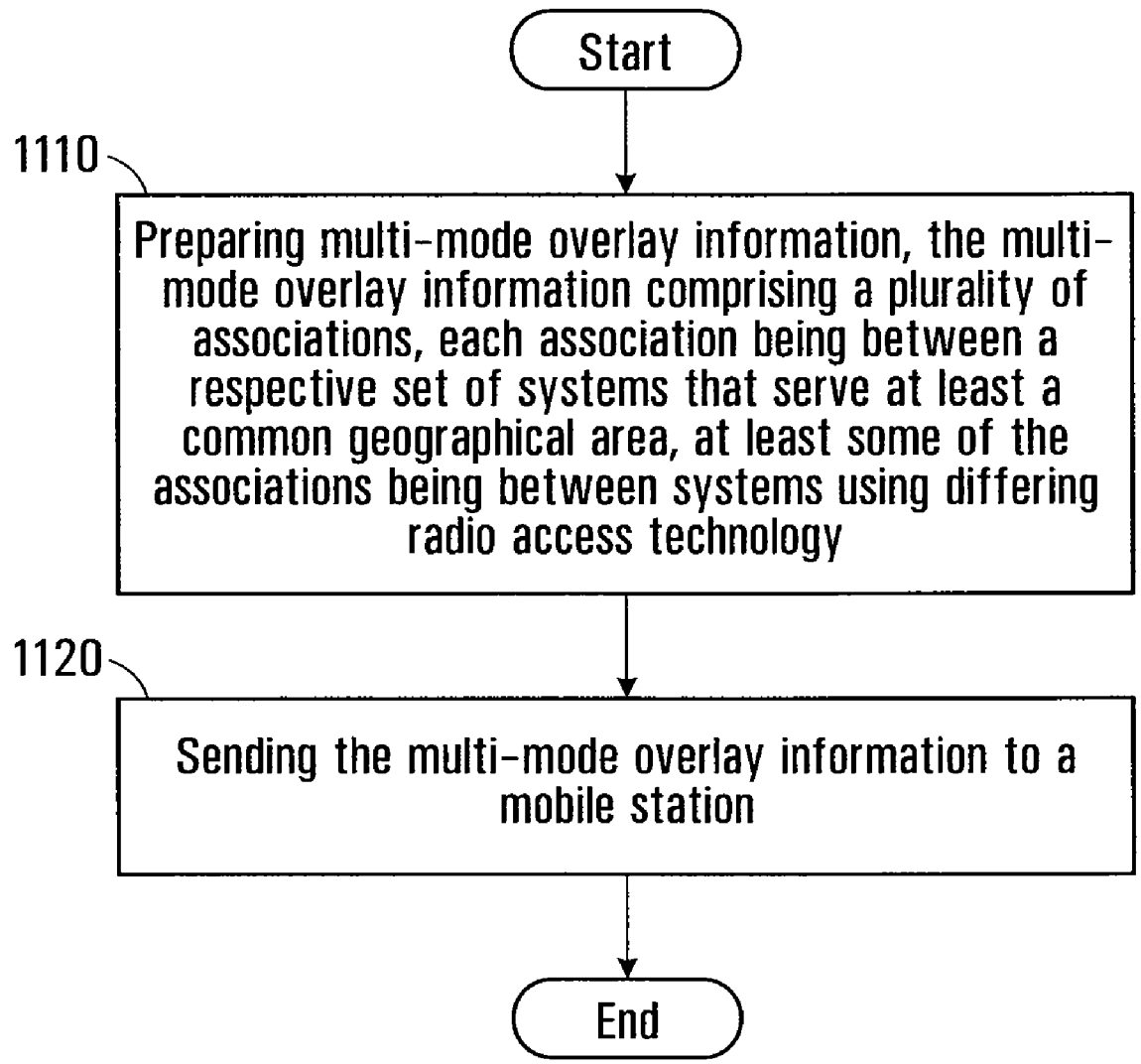
FIG. 11 is a flowchart of a general method of preparation of multi-mode overlay information.

FIG. 11 will now be used to describe a method for a system to provide multi-mode overlay information to a mobile station.

In step 1110, the systems prepares multi-mode overlay information, the multi-mode overlay information comprising a plurality of associations, each association being between a respective set of systems that serve at least a common geographical area, at least some of the associations being between systems using differing radio access technology. The prepared multi-mode overlay information may for example take the form of the associations describe in FIG. 3 above.

In step 1120, the system sends the multi-mode overlay information to the mobile station. In some embodiments, this occurs prior to steps 720 and 760 in FIG. 7, so that the mobile can utilize the multi-mode overlay information prepared by the system.

In some embodiments, the multi-mode overlay information may include customized multi-mode overlay information for each mobile station that includes only systems of radio access technologies supported by the mobile station, based on multi-mode capability information from the mobile station.

Figure 8:
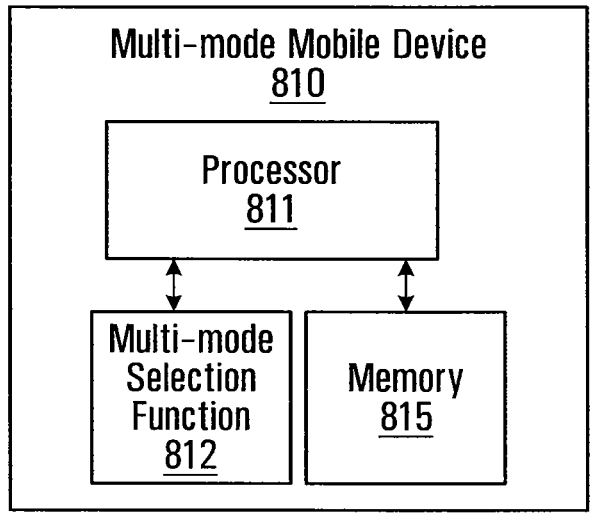
FIG. 8 is a block diagram of a multi-mode mobile device according to an embodiment of the application.

Referring now to FIG. 8, shown is a block diagram of an example multi-mode mobile device 810 adapted to communicate using circuit switched and packet switched communications separately or simultaneously, and perform multi-mode system selection using a multi-mode system selection algorithm as a function of multi-mode overlay information, the multi-mode overlay information comprising a plurality of associations, each association being between a respective set of systems that serve at least a common geographical area, at least some of the associations being between systems using differing radio access technology. The multi-mode mobile device 810 has a processor 811 coupled to a multi-mode selection function 812. Also included in multi-mode mobile device 810 is a memory 815 coupled to processor 811. In some embodiments, the multi-mode selection function 812 includes a RAT Specific Network Selection Algorithm and/or a Multi-mode Network Selection Algorithm described above in regard to FIGS. 1 and 2. In some embodiments, the memory 815 includes RAT Specific Network Selection Information and/or Multi-mode Overlay Information described above in regard to FIGS. 1 and 2.

In operation, the multi-mode mobile device 810 is adapted to communicate using circuit switched and packet switched communications separately or simultaneously. Circuit switched communication may include, for example, a voice call. Packet switched communication may include any data, for example, streaming video data or VoIP (Voice over IP). According to one aspect, the multi-mode selection function 812 operates to provide the multi-mode mobile device 810 with functionality of performing multi-mode system selection using a multi-mode system selection algorithm as a function of multi-mode overlay information stored in memory 815. An example of how this may be accomplished is described above with reference to FIG. 7. In some embodiments, the multi-mode selection function 812 is software implemented and may be executed by the processor 811. However, more generally, the multi-mode selection function 812 may be implemented as software, hardware, firmware, or as any appropriate combination of software, hardware and firmware.

Figure 9:
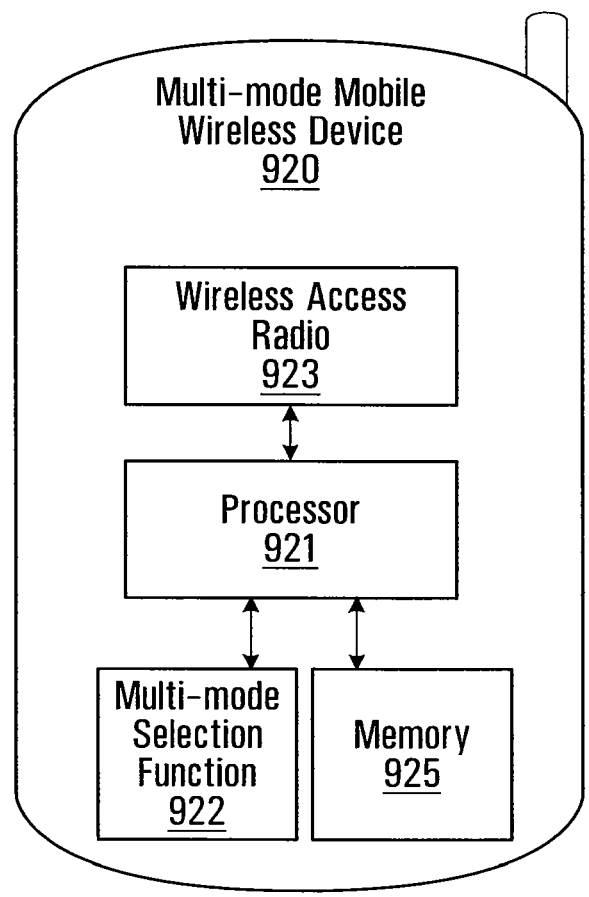
FIG. 9 is a block diagram of a multi-mode mobile wireless device according to an embodiment of the application.

Referring now to FIG. 9, shown is a block diagram of an example multi-mode wireless device 920 adapted to communicate using circuit switched and packet switched communications separately or simultaneously, and perform multi-mode system selection using a multi-mode system selection algorithm as a function of multi-mode overlay information, the multi-mode overlay information comprising a plurality of associations, each association being between a respective set of systems that serve at least a common geographical area, at least some of the associations being between systems using differing radio access technology. The multi-mode wireless device 920 has a processor 921 coupled to a wireless access radio 923 and a multi-mode selection function 922. Also included in multi-mode mobile device 922 is a memory 925 coupled to processor 921. In some embodiments, the multi-mode selection function 922 includes a RAT Specific Network Selection Algorithm and/or a Multi-mode Network Selection Algorithm described above in regard to FIGS. 1 and 2. In some embodiments, the memory 925 includes RAT Specific Network Selection Information and/or Multi-mode Overlay Information described above in regard to FIGS. 1 and 2.

In operation, the multi-mode wireless device 920 is adapted to communicate wirelessly over a wireless communication network, for example a cellular network, using the wireless access radio 923. The multi-mode wireless device 920 is adapted to communicate using circuit switched and packet switched communications separately or simultaneously. According to one aspect, the multi-mode selection function 922 provides the multi-mode wireless device 920 with the functionality of performing multi-mode system selection using a multi-mode system selection algorithm as a function of multi-mode overlay information stored in memory 925. In some embodiments, the multi-mode selection function 922 is software implemented and may be executed by the processor 921. However, more generally, the multi-mode selection function 922 may be implemented as software, hardware, firmware, or as any appropriate combination of software, hardware and firmware.

The devices of FIGS. 8 and 9 show only functionality relevant to the aspects described herein. It is to be understood that practical implementations would include additional functionality to that shown.

Figure 10:
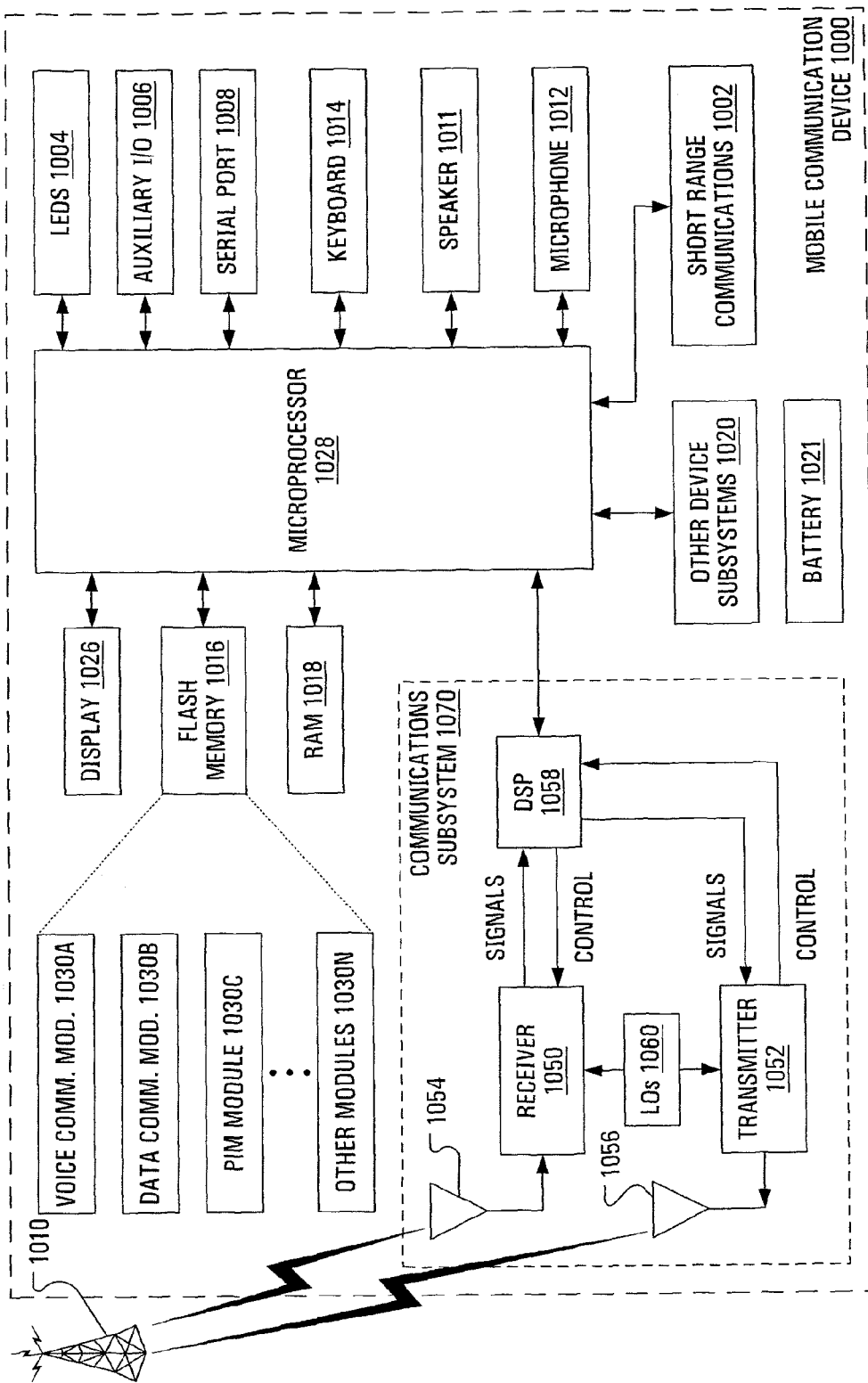
FIG. 10 is a block diagram of an example mobile communication device.

Referring now to FIG. 10, shown is a block diagram of a mobile communication device 1000 that may implement mobile device related methods described herein. It is to be understood that the mobile device 1000 is shown with very specific details for example purposes only.

A processing device (a microprocessor 1028) is shown schematically as coupled between a keyboard 1014 and a display 1026. The microprocessor 828 controls operation of the display 1026, as well as overall operation of the mobile device 1000, in response to actuation of keys on the keyboard 1014 by a user.

The mobile device 1000 has a housing that may be elongated vertically, or may take on other sizes and shapes (including clamshell housing structures). The keyboard 1014 may include a mode selection key, or other hardware or software for switching between text entry and telephony entry.

In addition to the microprocessor 1028, other parts of the mobile device 1000 are shown schematically. These include: a communications subsystem 1070; a short-range communications subsystem 1002; the keyboard 1014 and the display 1026, along with other input/output devices including a set of LEDS 1004, a set of auxiliary I/O devices 1006, a serial port 1008, a speaker 1011 and a microphone 1012; as well as memory devices including a flash memory 1016 and a Random Access Memory (RAM) 1018; and various other device subsystems 1020. The mobile device 1000 may have a battery 1021 to power the active elements of the mobile device 1000. The mobile device 1000 is in some embodiments a two-way radio frequency (RF) communication device having voice and data communication capabilities. In addition, the mobile device 1000 in some embodiments has the capability to communicate with other computer systems via the Internet.

Operating system software executed by the microprocessor 1028 is in some embodiments stored in a persistent store, such as the flash memory 1016, but may be stored in other types of memory devices, such as a read only memory (ROM) or similar storage element. In addition, system software, specific device applications, or parts thereof, may be temporarily loaded into a volatile store, such as the RAM 1018. Communication signals received by the mobile device 1000 may also be stored to the RAM 1018.

The microprocessor 1028, in addition to its operating system functions, enables execution of software applications on the mobile device 1000. A predetermined set of software applications that control basic device operations, such as a voice communications module 1030A and a data communications module 1030B, may be installed on the mobile device 1000 during manufacture. In addition, a personal information manager (PIM) application module 1030C may also be installed on the mobile device 1000 during manufacture. The PIM application is in some embodiments capable of organizing and managing data items, such as e-mail, calendar events, voice mails, appointments, and task items. The PIM application is also in some embodiments capable of sending and receiving data items via a wireless network 1010. In some embodiments, the data items managed by the PIM application are seamlessly integrated, synchronized and updated via the wireless network 1010 with the device user's corresponding data items stored or associated with a host computer system. As well, additional software modules, illustrated as other software module 1030N, may be installed during manufacture.

Communication functions, including data and voice communications, are performed through the communication subsystem 1070, and possibly through the short-range communications subsystem 1002. The communication subsystem 1070 includes a receiver 1050, a transmitter 1052 and one or more antennas, illustrated as a receive antenna 1054 and a transmit antenna 1056. In addition, the communication subsystem 1070 also includes a processing module, such as a digital signal processor (DSP) 1058, and local oscillators (LOs) 1060. The specific design and implementation of the communication subsystem 1070 is dependent upon the communication network in which the mobile device 700 is intended to operate. For example, the communication subsystem 1070 of the mobile device 1000 may be designed to operate with the MOBITEX™, DATATAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 1000.

Network access may vary depending upon the type of communication system. For example, in the MOBITEX™ and DATATAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 1000 may send and receive communication signals over the communication network 1010. Signals received from the communication network 1010 by the receive antenna 1054 are routed to the receiver 1050, which provides for signal amplification, frequency down conversion, filtering, channel selection, etc., and may also provide analog to digital conversion. Analog-to-digital conversion of the received signal allows the DSP 1058 to perform more complex communication functions, such as demodulation and decoding. In a similar manner, signals to be transmitted to the network 1010 are processed (e.g., modulated and encoded) by the DSP 1058 and are then provided to the transmitter 1052 for digital to analog conversion, frequency up conversion, filtering, amplification and transmission to the communication network 1010 (or networks) via the transmit antenna 1056.

In addition to processing communication signals, the DSP 1058 provides for control of the receiver 1050 and the transmitter 1052. For example, gains applied to communication signals in the receiver 1050 and the transmitter 1052 may be adaptively controlled through automatic gain control algorithms implemented in the DSP 1058.

In a data communication mode, a received signal, such as a text message or web page download, is processed by the communication subsystem 1070 and is input to the microprocessor 1028. The received signal is then further processed by the microprocessor 1028 for an output to the display 1026, or alternatively to some other auxiliary I/O devices 1006. A device user may also compose data items, such as e-mail messages, using the keyboard 1014 and/or some other auxiliary I/O device 1006, such as a touchpad, a rocker switch, a thumb-wheel, or some other type of input device. The composed data items may then be transmitted over the communication network 1010 via the communication subsystem 1070.

In a voice communication mode, overall operation of the device is substantially similar to the data communication mode, except that received signals are output to a speaker 1011, and signals for transmission are generated by a microphone 1012. Alternative voice or audio I/O subsystems, such as a voice message recording subsystem, may also be implemented on the mobile device 1000. In addition, the display 1016 may also be utilized in voice communication mode, for example, to display the identity of a calling party, the duration of a voice call, or other voice call related information.

The short-range communications subsystem 1002 enables communication between the mobile device 1000 and other proximate systems or devices, which need not necessarily be similar devices. For example, the short-range communications subsystem may include an infrared device and associated circuits and components, or a BLUETOOTH™ communication module to provide for communication with similarly-enabled systems and devices.

Numerous modifications and variations of the present application are possible in light of the above teachings. It is therefore to be understood that within the scope of the appended claims, the subject matter may be practiced otherwise than as specifically described herein.

We claim:

1. A method performed by a multi-mode mobile station, the method comprising:
   receiving a request message for multi-mode capability of the multi-mode mobile station;
   in response to the request message, transmitting a response message including multi-mode capability information of the multi-mode mobile station;
   receiving a message comprising multi-mode overlay information, the multi-mode overlay information associated with the multi-mode capability information of the multi-mode mobile station;
   selecting a first system based on the multi-mode overlay information, the multi-mode overlay information comprising:
      a prioritized list of systems that serve at least a common geographical area; and
      priority information comprising a higher priority search time associated with at least the first system; and
   searching for a higher priority system after a time specified by the higher priority search time associated with the first system;
   wherein the multi-mode overlay information comprises timing information in respect of searches to be conducted for systems; and wherein:
   the timing information is in respect of each system to be searched for, the timing information specifying for a given type of system included in the multi-mode overlay information a time between searches for this type of system that the mobile station is to use when searching for this type of system as a higher priority system than a current system.

2. The method of claim 1 further comprising:
   storing the multi-mode overlay information.

3. The method of claim 1, wherein the multi-mode overlay information comprises:
   identification parameters for each system of the prioritized list of systems.

4. The method of claim 3, wherein the identification parameters for at least one CDMA (code division multiple access) system comprise at least one of:
   a SID (system identifier); a SID and a NID (network identifier); an MCC (mobile country code); and an MCC and an MNC (mobile network code); and
   wherein the identification parameters for at least one GSM/GPRS/UMTS (Global System for Mobile Communications/General Packet Radio Services/Universal Mobile Telecommunications System) system comprise at least one of:
   an MCC; an MCC and an MNC; and an MCC, an MNC and a LAC (location area code).

5. The method of claim 1, wherein multi-mode overlay information comprises a plurality of group associations, at least one of said group associations being between a respective set of systems that serve the common geographical area.

6. The method of claim 1 further comprising:
   storing radio access technology specific system selection information for at least one radio access technology; and
   performing system selection using a radio access technology specific system selection algorithm.

7. The method of claim 6, wherein storing radio access technology specific system selection information for at least one radio access technology and performing system selection using a radio access technology specific system selection algorithm comprises:
   for CDMA storing a CDMA PRL (Preferred Roaming List), and performing CDMA system selection using the CDMA PRL; and
   for GSM/GPRS/UMTS storing a PLMN (public land mobile network) list, and performing system selection using the PLMN list.

8. The method of claim 1, wherein selecting a first system based on multi-mode overlay information comprises:
   attempting to acquire the first system using one of: a most recently used radio access technology and a default radio access technology; and
   having acquired the first system, determining system information from the multi-mode overlay information.

9. The method of claim 1, wherein searching for a higher priority system comprises:
   determining that there is a higher priority system; and
   acquiring the higher priority system.

10. The method of claim 1, wherein performing system selection comprises performing searches for systems in accordance with the timing information.

11. The method of claim 1, wherein the timing information comprises at least one of:
   a set of bits that indicate an actual timer value;
   a set of bits that indicate an actual timer value offset by a predetermined value; and
   a set of bits that index into a table of timer values.

12. The method of claim 1, wherein:
the timing information is in respect of each system identified in the multi-mode overlay information, the timing information indicating for a given system, while that system is acquired, at least one of:
how often to search for a system with higher priority than the given system and with a different RAT than the RAT of the given system; and
how often to search for a system with higher priority than the given system and with a different RAT than the RAT of the given system, wherein for at least some systems, multiple timing informations are specified each for a respective higher priority system.

13. The method of claim 1, wherein receiving a message comprising multi-mode overlay information, the multi-mode overlay information associated with the multi-mode capability of the mobile station comprises receiving the multi-mode overlay information over the air, and wherein receiving the multi-mode overlay information over the air comprises:
receiving for each system of the prioritized list of systems:
a group identifier identifying a group of association that the system belongs to;
a system type identifying a type of the system and at least one identification parameter; and
priority information indicating relative priority of the system;
search timing information.

14. The method of claim 1, wherein the multi-mode overlay information for a system comprises:
overlay group information defining a group association of the system with other systems in at least a common geographical location;
a system type identifying a type of the system and at least one identification parameter; and
intra-group overlay priority timing information in respect of searches to be conducted for systems.

15. The method of claim 1 wherein the first system is a system different from the highest priority system.

16. The method of claim 1, wherein the multi-mode overlay information comprises more than one radio access technology grouped together as a single system.

17. The method of claim 1 wherein the timing information is provided in respect of some but not necessarily all of the systems.

18. The method of claim 1 wherein the timing information includes an indication of for which systems timing information is provided.

19. The method of claim 1 wherein the multi-mode capability information comprises at least one bit for each of a plurality of radio access technologies indicating whether each radio access technology is supported.

20. The method of claim 1 wherein the multi-mode capability information comprises at least one bit for each of CDMA, GSM/GPRS/UMTS, and WLAN.

21. An apparatus comprising:
a multi-mode system selection function for performing multi-mode system selection as a function of multi-mode overlay information, the multi-mode overlay information comprising a plurality of group associations, at least one of the group associations being between a respective set of systems that serve at least a common geographical area;
a memory for storing multi-mode overlay information, the multi-mode overlay information comprising:
a prioritized list of systems that serve at least a common geographical area; and
priority information comprising a higher priority search time associated with one or more systems of the prioritized list of systems;
a wireless access radio for accessing systems having one or more radio access technologies, the wireless access radio further configured to:
receive a request message for multi-mode capability of the mobile station;
in response to the request message, transmit a response message including the multi-mode capability information of the mobile station;
receive a message comprising multi-mode overlay information, the multi-mode overlay information associated with the multi-mode capability information of the mobile station;
wherein the multi-mode overlay information comprises timing information in respect of searches to be conducted for systems; and
wherein the timing information is in respect of each system to be searched for, the timing information specifying for a given type of system included in the multi-mode overlay information a time between searches for this type of system that the mobile station is to use when searching for this type of system as a higher priority system than a current system.

22. The apparatus of claim 21, wherein the multi-mode overlay information comprises:
overlay group information defining an association of the system with other systems in at least a common geographical location;
a system type identifying a type of the system and at least one identification parameter; and
intra-group overlay priority timing information in respect of searches to be conducted for systems.

* * * * *